United States Patent
Nakamura et al.

(10) Patent No.: US 10,793,100 B2
(45) Date of Patent: Oct. 6, 2020

(54) AUTOMOBILE COWL GRILLE STRUCTURE

(71) Applicant: MAZDA MOTOR CORPORATION, Hiroshima (JP)

(72) Inventors: Atsushi Nakamura, Hatsukaichi (JP); Junji Kishimoto, Hiroshima (JP); Hiroshi Mizuguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 16/152,200

(22) Filed: Oct. 4, 2018

(65) Prior Publication Data
US 2019/0106078 A1 Apr. 11, 2019

(30) Foreign Application Priority Data
Oct. 11, 2017 (JP) ................... 2017-197701

(51) Int. Cl.
| | |
|---|---|
| *B60R 21/34* | (2011.01) |
| *B60H 1/28* | (2006.01) |
| *B62D 29/00* | (2006.01) |
| *B62D 25/08* | (2006.01) |
| *B60R 21/00* | (2006.01) |

(52) U.S. Cl.
CPC .............. *B60R 21/34* (2013.01); *B60H 1/28* (2013.01); *B62D 25/081* (2013.01); *B62D 29/005* (2013.01); *B60R 2021/0004* (2013.01); *B60R 2021/343* (2013.01)

(58) Field of Classification Search
CPC ........... B60R 21/34; B60R 2021/0004; B60R 2021/343; B60R 19/52; B62D 29/005; B62D 25/081; B60H 1/28

USPC .................................... 296/192, 187.04, 29
See application file for complete search history.

(56) References Cited

U.S. PATENT DOCUMENTS

| | | | |
|---|---|---|---|
| 9,415,744 B1 | 8/2016 | Stojkovic | |
| 2014/0319878 A1* | 10/2014 | Sano | B62D 25/081 296/192 |
| 2015/0035318 A1* | 2/2015 | Serizawa | B60R 21/34 296/187.09 |
| 2016/0083019 A1 | 3/2016 | Takada et al. | |
| 2016/0229459 A1* | 8/2016 | Ishihara | B62D 25/081 |
| 2016/0325787 A1* | 11/2016 | Matsumura | B62D 25/081 |

FOREIGN PATENT DOCUMENTS

| | | |
|---|---|---|
| JP | 2007-106366 A | 4/2007 |
| JP | 2009-161127 A | 7/2009 |
| JP | 2010-013100 A | 1/2010 |
| JP | 2015-116937 A | 6/2015 |
| JP | 2016-060394 A | 4/2016 |

* cited by examiner

*Primary Examiner* — Jason S Morrow
*Assistant Examiner* — E Turner Hicks
(74) *Attorney, Agent, or Firm* — Studebaker & Brackett PC

(57) ABSTRACT

A resin cowl grille is provided to cover an upper portion of a cowl box. The cowl grille includes an upper wall portion and a front wall portion separated from the upper wall portion and provided with a bending promotion portion for inducing bending deformation upon action of load from above. The front wall portion includes a body portion and attachment piece portions extending backward from the body portion and fastened to a front portion of the upper wall portion. A weak portion for load in an upper-to-lower direction is formed by the attachment piece portion.

10 Claims, 8 Drawing Sheets

US 10,793,100 B2

AUTOMOBILE COWL GRILLE STRUCTURE

CROSS-REFERENCE TO RELATED APPLICATIONS

This application claims priority to Japanese Patent Application No. 2017-197701 filed on Oct. 11, 2017, the entire disclosure of which is incorporated by reference herein.

TECHNICAL FIELD

The technique disclosed herein relates to an automobile cowl grille structure.

BACKGROUND

For improving protection performance of a pedestrian falling over a bonnet upon collision against impact received from the bonnet, a configuration has been known, in which a bending promotion portion such as a cutout for inducing bending deformation of a cowl grille when load acts from the bonnet positioned above the cowl grille is formed at the cowl grille as described as an example in Japanese Patent Publication No. 2007-106366.

SUMMARY

The cowl grille structure of the above-described publication employs, for reasons such as enhancement of the degree of freedom of designing in material selection, the cowl grille is divided into an upper wall portion extending from an upper side of a front edge portion of a front window to below a rear edge portion of the bonnet and a front wall portion extending downward from a front edge portion of the upper wall portion.

Moreover, it is configured such that the upper wall portion and the front wall portion are coupled with a fastening tool (a fixing tool) such as a screw at an overlapping portion (see paragraph [0026] of the above-described publication).

However, in the cowl grille configured such that the upper wall portion and the front wall portion are divided from each other and are fastened with the screw etc. as described above, when load acts from above the cowl grille, the upper wall portion and the front wall portion are not separated from each other by, e.g., rupturing of a fastening portion or the vicinity of the fastening portion, and a fastened state is maintained in some cases. In this case, bending deformation of the front wall portion is not promoted at the bending promotion portion in the cowl grille. For this reason, the amount of deformation in an upper-to-lower direction in response to the load from above cannot be obtained. Thus, there is room for improvement in terms of the pedestrian protection performance.

The technique disclosed herein enhances protection performance by deformation of a cowl grille in an upper-to-lower direction.

The technique disclosed herein relates to an automobile cowl grille structure. A cowl grille is made of resin, and is provided to cover an upper portion of a cowl box.

The cowl grille includes
an upper wall portion, and
a front wall portion separated from the upper wall portion and provided with a bending promotion portion for inducing bending deformation upon action of load from above,
the front wall portion includes
a front wall body portion, and
an attachment piece portion extending backward from the front wall body portion and fastened to a front portion of the upper wall portion, and
a weak portion for load in an upper-to-lower direction is formed by the attachment piece portion.

According to the above-described configuration, when the load acts on the cowl grille from above, the cowl grille can be separated into the upper wall portion and the front wall portion, starting from the weak portion. Thus, deformation of the bending promotion portion can be facilitated.

A cutout may be formed at a corner portion between the front wall body portion and the attachment piece portion on a base side of the attachment piece portion.

By the load from above, the attachment piece portion is displaced to deform and bend downward about a base portion as the point of support. The attachment piece portion can be ruptured and separated from the front wall body portion at the base portion.

The attachment piece portion may include multiple attachment piece portions each formed with spacing in a vehicle width direction in the vicinity of fastening portions for the upper wall portion.

According to the above-described configuration, the attachment piece portion is formed in the vicinity of each fastening portion, and therefore, stiffness of the attachment piece portion can be reduced. The weak portion for the load in the upper-to-lower direction is formed by the attachment piece portion, and therefore, the upper wall portion and the front wall portion can be easily separated from each other.

The front wall portion may be inclined such that an upper side is forward of a lower side as viewed from the side, and the bending promotion portion may be formed at a portion on a rear side of a front end of the upper wall portion.

According to the above-described configuration, the front wall portion is pressed down at a front end portion of the upper wall portion after the fastening portion between the upper wall portion and the front wall portion or the vicinity thereof has been ruptured, and therefore, the bending promotion portion can function securely. That is, bending of the front wall portion can be promoted at the bending promotion portion, and the front wall portion can be easily deformed.

The upper wall portion may be made of a PP material, and the front wall portion may be made of a glass fiber-containing PP material.

According to the above-described configuration, the front wall portion arranged closer to an engine is made of the glass fiber-containing PP material, and therefore, the cowl grille is less susceptible to heat from the engine.

On the other hand, the upper wall portion is made of the PP material, and therefore, a cost can be reduced as compared to a configuration in which the entirety of the cowl grille is made of the glass fiber-containing PP material.

Further, although the stiffness is enhanced by formation of the front wall portion from the glass fiber-containing PP material, the weak portion is, as described above, formed by the attachment piece portion, and therefore, even the front wall portion with high stiffness can be reliably deformed at the bending promotion portion.

DETAILED DESCRIPTION

Hereinafter, an embodiment will be described in detail based on the drawings.

In the figures, an arrow F indicates a vehicle front side, an arrow L indicates a vehicle left side, an arrow R indicates a vehicle right side, and an arrow U indicates a vehicle upper side.

Figure 1:
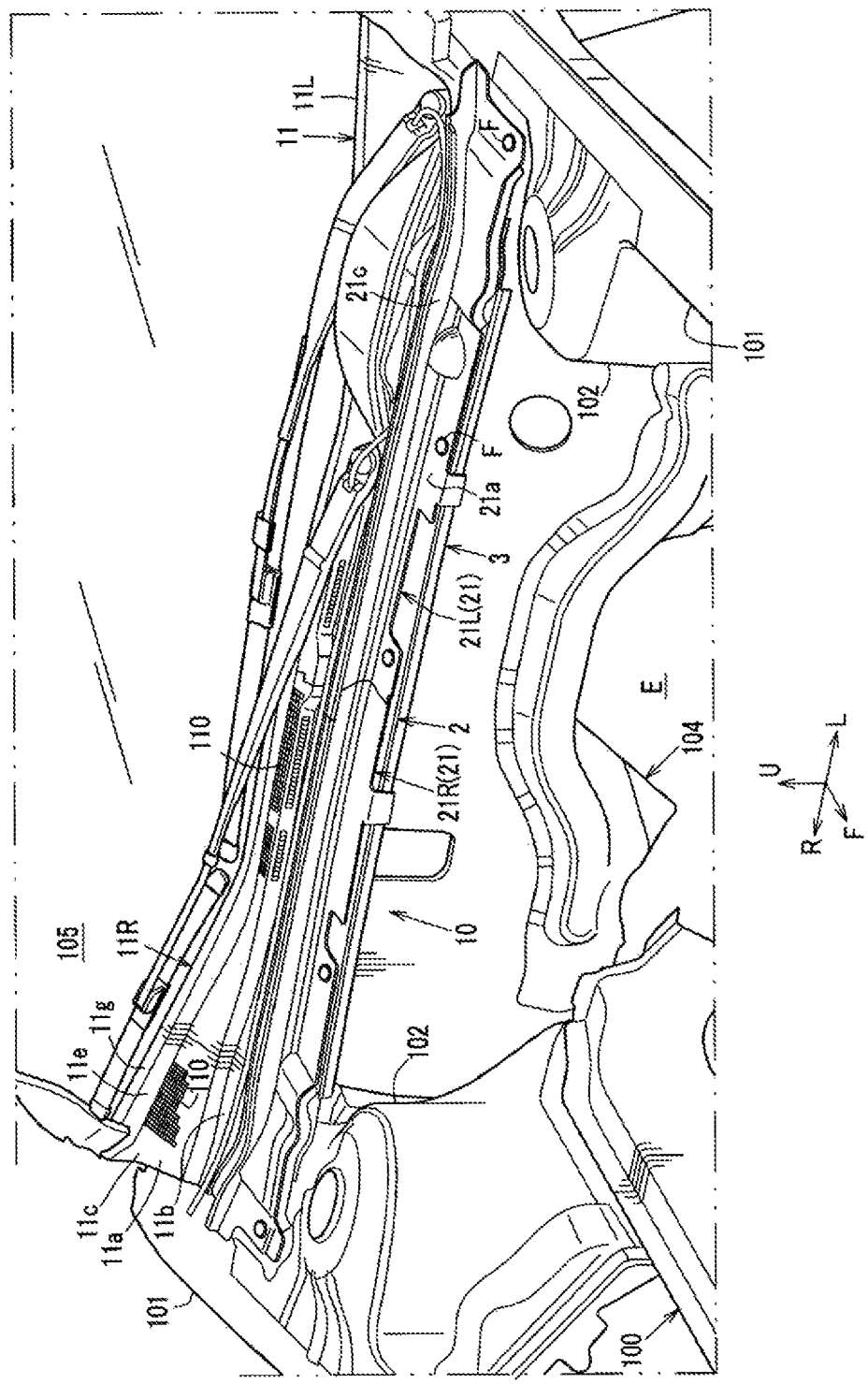
FIG. 1 is an external view of a main portion of a front portion of a vehicle including a cowl grille structure of the present embodiment.

As illustrated in FIG. 1, a pair of right and left front side frames 100 (only the right front side frame 100 is illustrated) as vehicle body rigid members extending in a front-to-rear direction of a vehicle is provided on the outside of an engine room E in a vehicle width direction at a front portion of a vehicle body, a pair of right and left apron reinforcements 101 extending in the vehicle front-to-rear direction is provided on the outside and upper side of the pair of right and left front side frames 100 in the vehicle width direction.

On each of the right and left sides of the front portion of the vehicle body, a suspension tower portion 102 configured to support an upper portion of a front suspension device is attached between the corresponding front side frame 100 and the corresponding apron reinforcement 101.

A bonnet 103 (see FIG. 4) configured to close an upper opening of the engine room E is provided at an upper portion of the engine room E, and is, by a not-shown hinge member, openably supported about a rear end portion as a supporting point in the vicinity of rear ends of the apron reinforcements 101.

Figure 4:
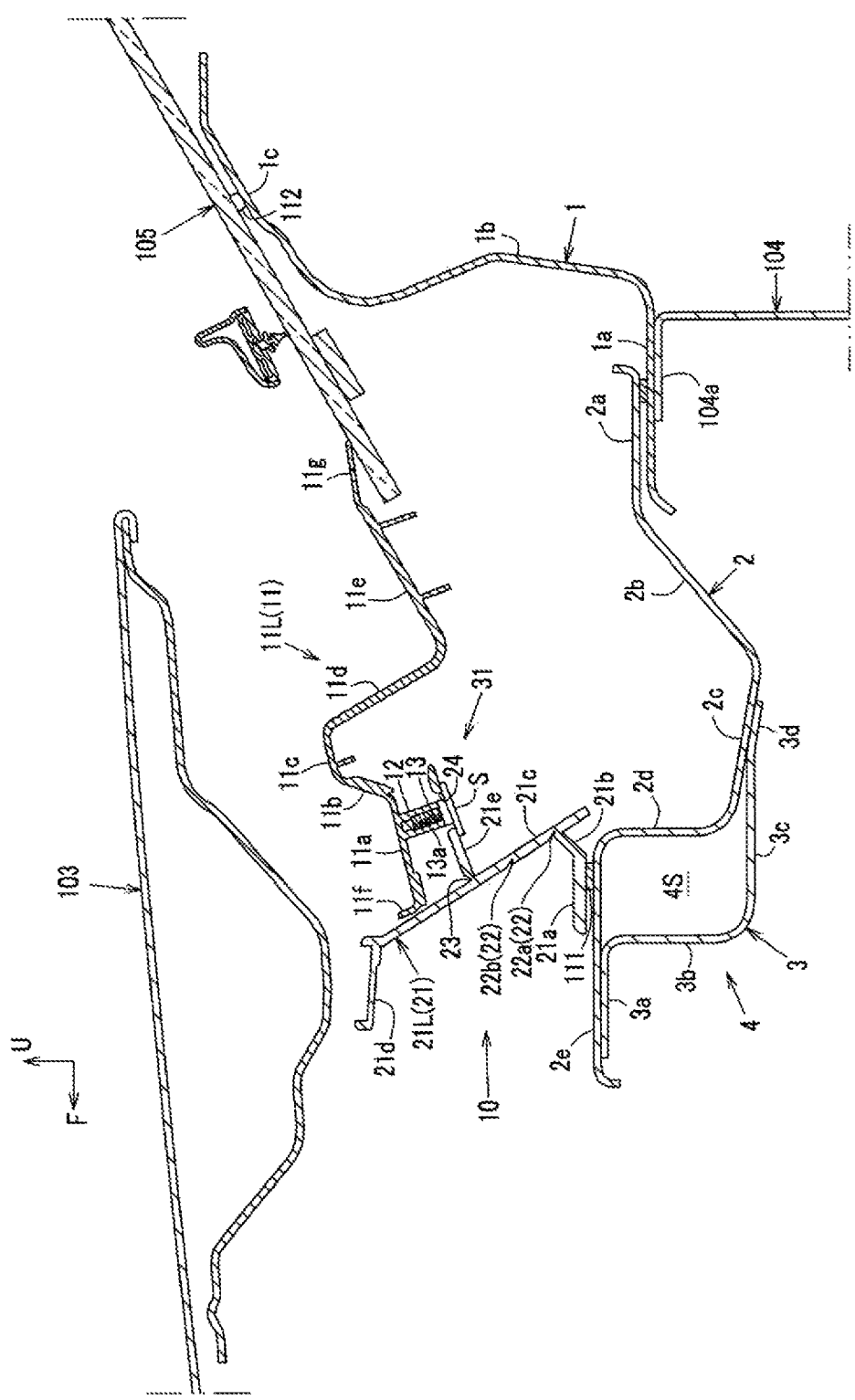
FIG. 4 is a sectional view of the cowl grille structure along an A-A line of FIG. 3.
Figure 5:
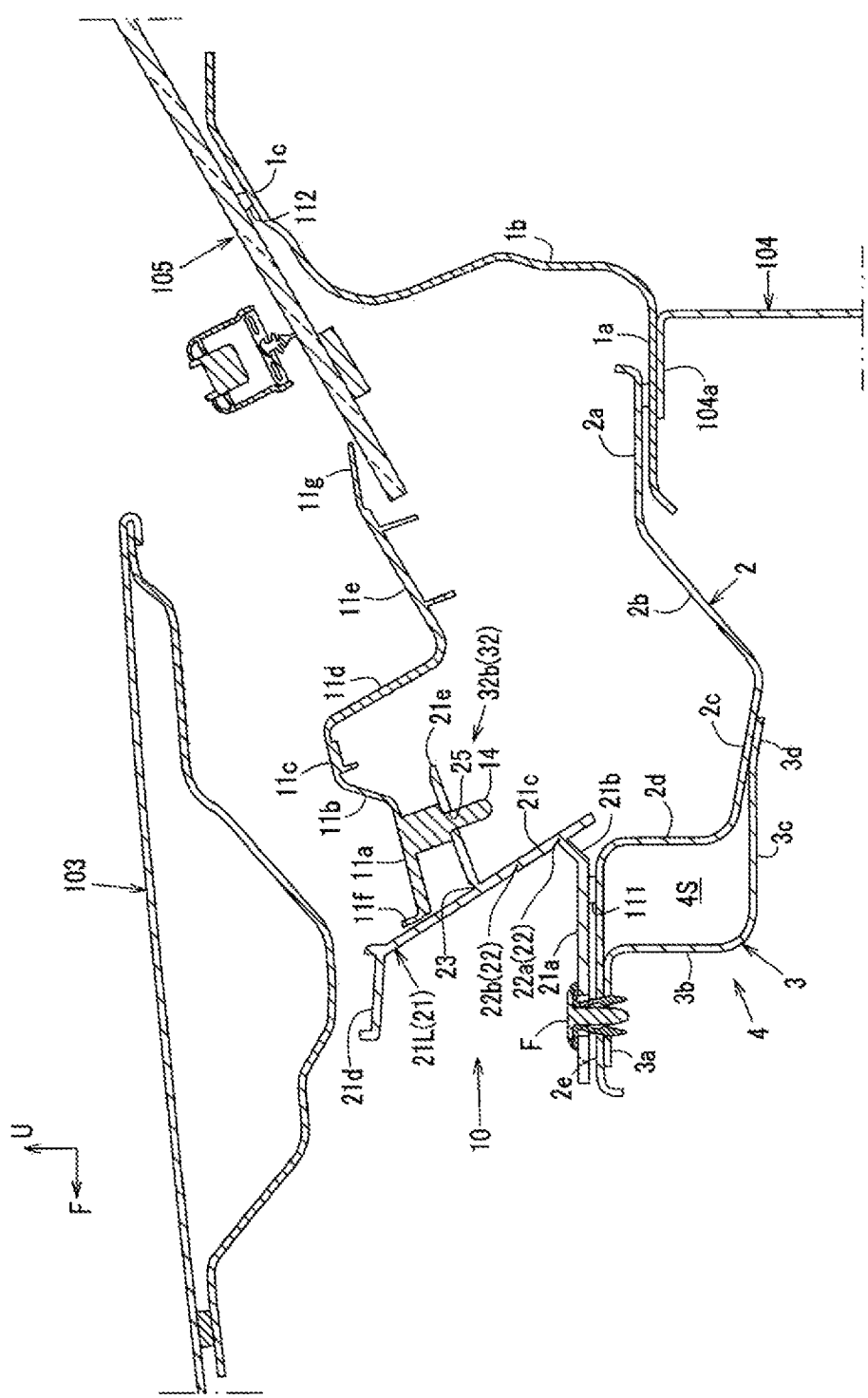
FIG. 5 is a sectional view of the cowl grille structure along a B-B line of FIG. 3.
Figure 6:
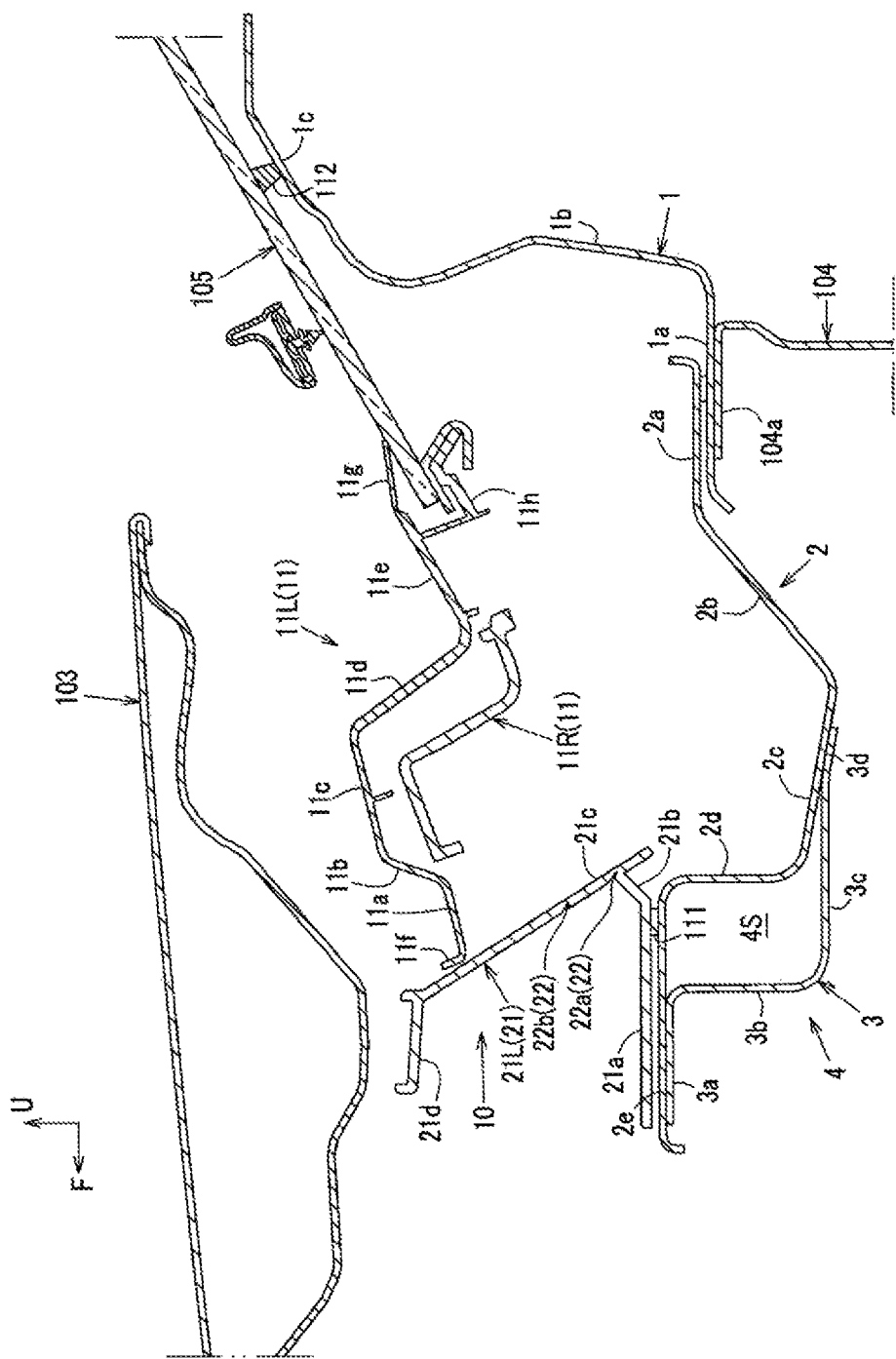
FIG. 6 is a sectional view of the cowl grille structure along a C-C line of FIG. 3.

A dash panel 104 configured to separate the engine room E and a vehicle compartment is provided in the vehicle width direction at a rear portion of the engine room E, and a cowl panel 1 is arranged at an upper portion of the dash panel 104 as illustrated in FIGS. 4 to 6.

The cowl panel 1 is configured to support, from below, a front window 105 across the substantially entire length in the vehicle width direction through a buffer material 112.

The cowl panel 1 has a lower portion 1a, a vertical wall portion 1b, and an upper portion 1c, and is formed in a substantially S-shape as viewed from the side (as viewed in a section perpendicular to the vehicle width direction). The lower portion 1a is, from above, joined and fixed to an upper edge flange 104a extending forward from an upper edge of the dash panel 104.

Although not shown in the figure, a front pillar extending backward and upward of the vehicle from a hinge pillar upper end to a roof rail front end is provided at each side edge portion of the front window 105 in the vehicle width direction. The front window 105 is configured such that both side edge portions thereof in the vehicle width direction are supported in a rear-higher front-lower manner by the front pillars.

As illustrated in FIGS. 4 to 6, a cowl member 2 (a cowl front panel) is joined and fixed to the front side of the lower portion 1a of the cowl panel 1, and is supported on the upper edge flange 104a of the dash panel 104 through the lower portion 1a of the cowl panel 1 to extend forward from the lower portion 1a of the cowl panel 1.

The cowl member 2 is, as viewed from the side, integrally formed by a rear flange portion 2a joined to an upper surface of the lower portion 1a of the cowl panel 1, a slant portion 2b extending inclined downward from a front end of the rear flange portion 2a toward the front side, a bottom portion 2c extending upward from a lower front end of the slant portion 2b toward the front side, a vertical wall portion 2d extending upward from a front end of the bottom portion 2c, and a front flange portion 2e extending horizontally forward from an upper end of the vertical wall portion 2d. As viewed from the side, the slant portion 2b, the bottom portion 2c, and the vertical wall portion 2d form a substantially recessed shape opening on the upper side.

A cowl reinforcement 3 is, from below, joined to a front portion of the cowl member 2.

The cowl reinforcement 3 is, as viewed from the side, integrally formed by a front flange portion 3a extending horizontally in the front-to-rear direction, a vertical wall portion 3b extending downward from a rear end of the front flange portion 3a, a lower wall portion 3c extending substantially horizontally backward from a lower end of the vertical wall portion 3b, and a rear end flange portion 3d extending downward from a rear end of the lower wall portion 3c toward the rear side.

Moreover, an upper surface of the rear end flange portion 3d of the cowl reinforcement 3 is joined to a lower surface of the bottom portion 2c of the cowl member 2, and an upper surface of the front flange portion 3a of the cowl reinforcement 3 is joined to a lower surface of the front flange portion 2e of the cowl member 2. The cowl member 2 and the cowl reinforcement 3 form a cowl closed section 4S extending in the vehicle width direction inside the cowl member 2 and the cowl reinforcement 3.

The cowl panel 1, the cowl member 2, and the cowl reinforcement 3 form a cowl box 4 having a so-called open cowl structure extending in the vehicle width direction.

As illustrated in FIGS. 4 to 6, a cowl grille 10 extending in the vehicle width direction is provided above the cowl box 4. As illustrated in FIGS. 1, 2, and 4 to 6, the cowl grille 10 is provided from a front edge portion of the front window 105 to below a rear end portion of the bonnet 103, and is supported on the cowl box 4. Thus, the cowl grille 10 is arranged to cover an upper portion of the cowl box 4.

As illustrated in FIGS. 1 to 6, the cowl grille 10 is made of synthetic resin with a divided structure mainly including two members of an upper wall portion 11 (a cowl grille upper portion) and a front wall portion 21 (a cowl grille front portion) in the front-to-rear direction.

Figure 2:
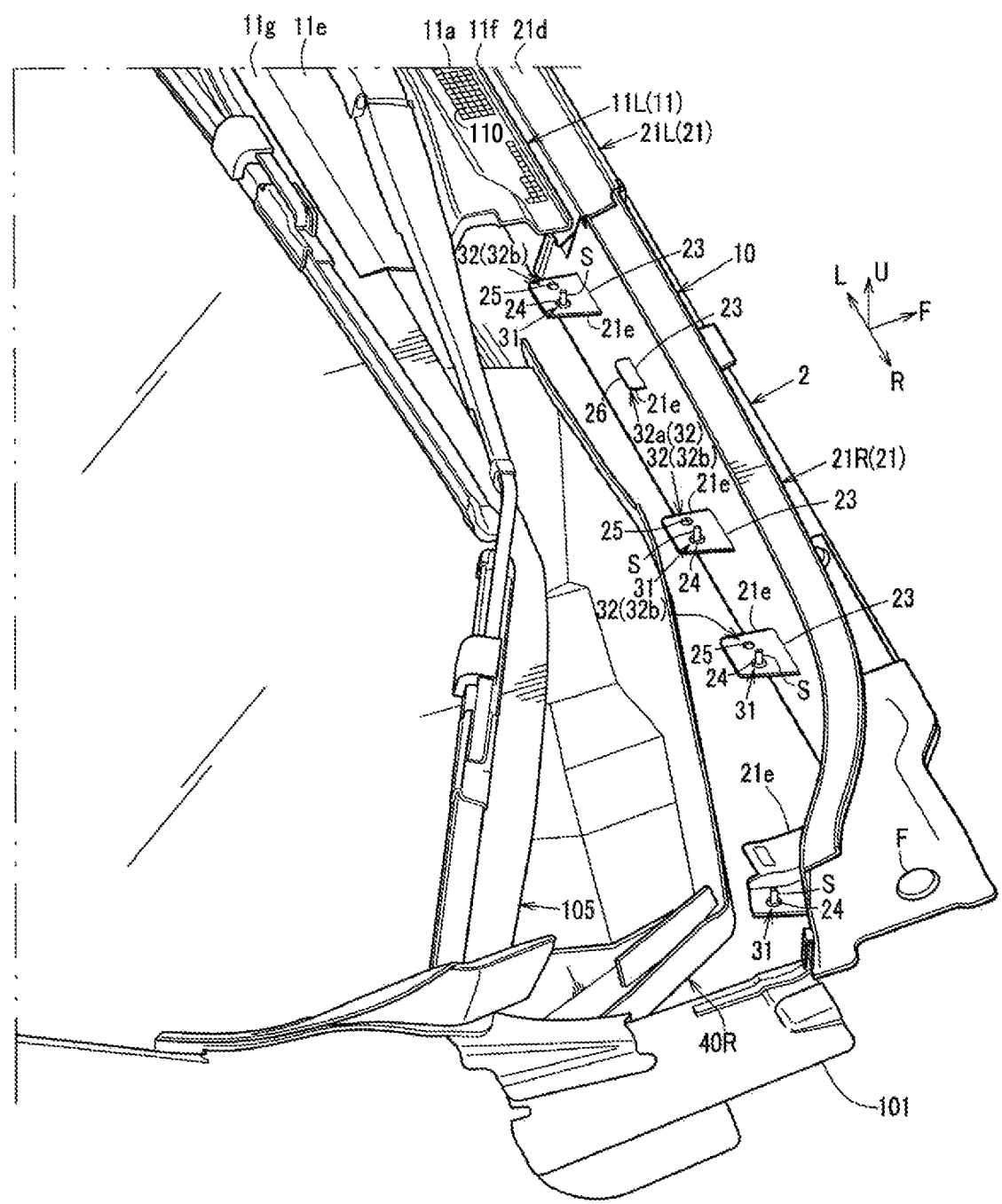
FIG. 2 is a perspective view of the cowl grille structure of the present embodiment from an upper rear side, an upper wall portion on a right side of the vehicle being removed.
Figure 3:
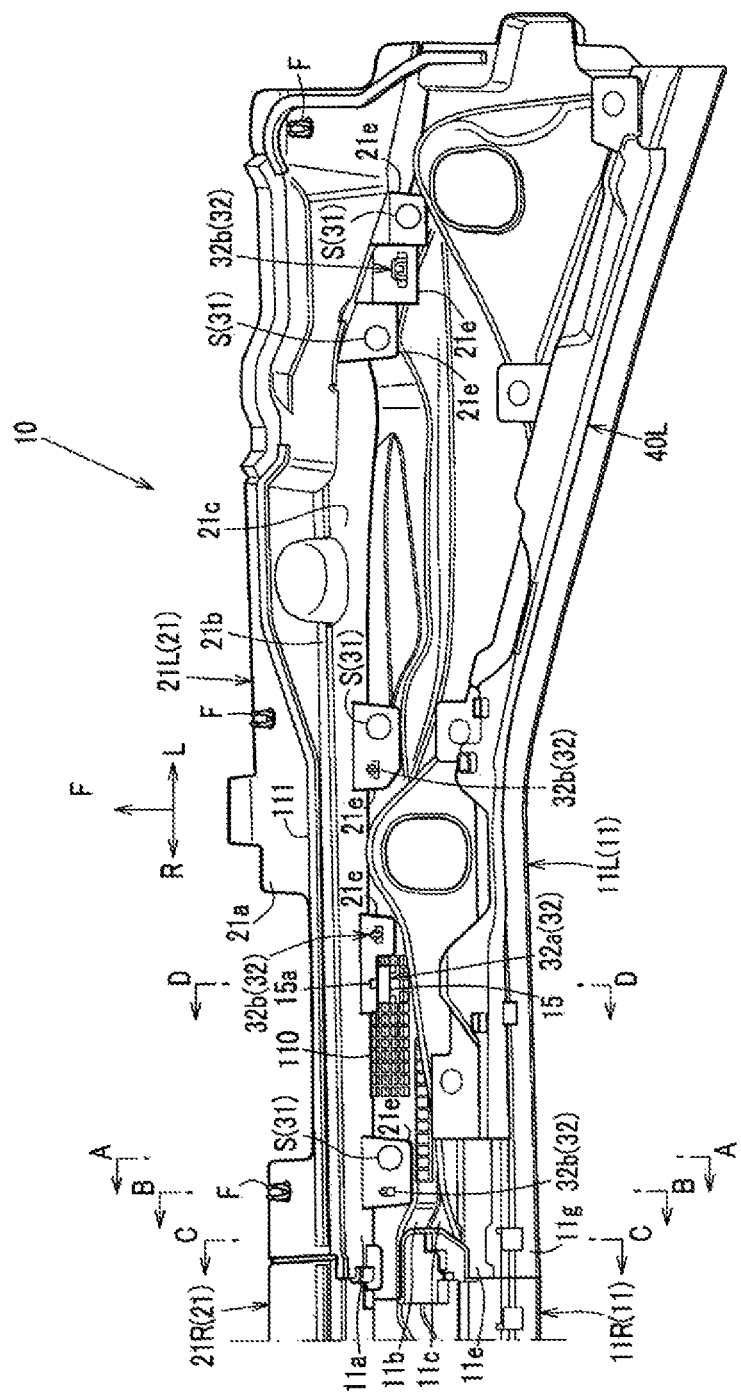
FIG. 3 is a bottom view of a vehicle left portion of the cowl grille structure of the present embodiment.

Further, as illustrated in FIGS. 1 to 3, both of the upper wall portion 11 and the front wall portion 21 also have a divided structure of two members in the vehicle width direction.

Specifically, as illustrated in FIG. 1, the upper wall portion 11 includes a right half upper wall portion 11R corresponding to the substantially right half of the entire length of the cowl grille 10 in the vehicle width direction, and a left half upper wall portion 11L corresponding to the substantially left half of the entire length of the cowl grille 10 in the vehicle width direction. The pair of right and left half upper wall portions 11R, 11L is integrated in such a manner that opposing end portions are coupled to each other by fastening etc. at a middle portion in the vehicle width direction (not shown).

Similarly, as illustrated in FIG. 1, the front wall portion 21 includes a right half front wall portion 21R corresponding to the substantially right half of the entire length of the cowl grille 10 in the vehicle width direction, and a left half front wall portion 21L corresponding to the substantially left half of the entire length of the cowl grille 10 in the vehicle width direction. The pair of right and left half front wall portions 21R, 21L is configured such that opposing end portions are coupled to each other by fastening etc. at a middle portion of the front wall portion 21 in the vehicle width direction (not shown).

Note that as illustrated in FIGS. 3 and 6, the right half front wall portion 21R is arranged below the left half front wall portion 21L at the opposing end portions of the pair of right and left half front wall portions 21R, 21L at the middle portion of the front wall portion 21 in the vehicle width direction. As described above, in the vicinity of a middle portion of the cowl grille 10 in the vehicle width direction, the opposing end portions of the right half front wall portion 21R and the left half front wall portion 21L are coupled in such a state that the opposing end portions partially overlap with each other in the vehicle width direction.

As illustrated in FIGS. 4 and 5, the front wall portion 21 is integrally made of, e.g., glass fiber-containing polypropylene (a glass fiber-containing PP material) as a synthetic resin material by a front wall base portion 21a extending horizontally in the front-to-rear direction and joined to the front flange portion 3a of the cowl member 2 from above through a seal member 111, a leg portion 21b extending upward from a rear end of the front wall base portion 21a toward the rear side, a front wall body portion 21c linearly extending upward from an upper rear end of the leg portion 21b toward the front side, a front wall upper portion 21d extending forward from an upper front end of the front wall body portion 21c to contact or face a lower surface of the bonnet 103, and a front wall attachment piece portion 21e extending upward from a middle portion of the front wall body portion 21c toward the rear side and attached to a front portion (a later-described upper wall front flange portion 11a) of the upper wall portion 11.

The front wall body portion 21c is configured such that a lower portion thereof is supported in a cantilever manner by the front wall base portion 21a through the leg portion 21b. A bending promotion portion 22 configured to induce bending deformation when load acts (is input) from above the cowl grille 10, i.e., a bonnet 103 side, is formed on a base side (the lower side) of the front wall body portion 21c.

The bending promotion portion 22 has a lower bending promotion portion 22a formed on the lower side on the base side of the front wall body portion 21c, and an upper bending promotion portion 22b formed on the upper side with respect to the lower bending promotion portion 22a. Each of the lower bending promotion portion 22a and the upper bending promotion portion 22b is a groove portion formed along the vehicle width direction at an inclined surface (a front surface) of the lower side of the front wall body portion 21c as viewed from the side.

The lower bending promotion portion 22a is a base portion of the leg portion 21b for the front wall body portion 21c, and is formed at a corner portion between an inclined surface (a front surface) of the upper side of the leg portion 21b as viewed from the side and the inclined surface (the front surface) of the lower side of the front wall body portion 21c as viewed from the side.

As illustrated in FIGS. 4 to 6, the lower bending promotion portion 22a and the upper bending promotion portion 22b are both formed at portions on the rear side of a portion facing a front end of the front wall body portion 21c formed inclined in such a front-higher rear-lower manner that one on the upper side is forward of one on the lower side as viewed from the side, i.e., a front end (a later-described contact portion 11f) of the upper wall portion 11 in this example.

As illustrated in FIGS. 2 and 4 to 7A, the front wall portion 21 is configured such that a cutout 23 for load in the upper-to-lower direction is formed across the entirety of the front wall attachment piece portion 21e in the vehicle width direction on a base side of the front wall attachment piece portion 21e for the front wall body portion 21c. The cutout 23 is formed at a corner portion between an inclined surface (an upper surface) of the upper side of the front wall body portion 21c as viewed from the side and an inclined surface (a rear surface) of the upper side of the front wall attachment piece portion 21e as viewed from the side.

As illustrated in FIGS. 4 to 6, the upper wall portion 11 is integrally made of, e.g., polypropylene (a PP material) as a synthetic resin material by the upper wall front flange portion 11a fastened to the front wall attachment piece portion 21e from above at fastening portions 31, an upper wall front vertical wall portion 11b extending upward from a rear end of the upper wall front flange portion 11a toward the rear side, an upper wall upper portion 11c extending substantially horizontally from a rear end of the upper wall front vertical wall portion 11b, an upper wall rear vertical wall portion 11d extending downward from a rear end of the upper wall upper portion 11c toward the rear side, and an upper wall rear portion 11e extending upward from a lower end of the upper wall rear vertical wall portion 11d toward the rear side with a gentler inclination than that of the upper wall front vertical wall portion 11b.

Note that as illustrated in FIGS. 1 to 3, slit-shaped openings 110 for external air injection are formed at the upper wall portion 11.

As illustrated in FIGS. 4 to 6, in a state in which the upper wall portion 11 and the front wall portion 21 are formed into an assembly as the cowl grille 10 as described later, the contact portion 11f contactable with the front wall body portion 21c inclined in the front-higher rear-lower manner from above is, at a front end of the upper wall front flange portion 11a, integrally formed to protrude upward from the front end of the upper wall front flange portion 11a.

Meanwhile, a rear extension piece 11g extending backward from a rear end of the upper wall rear portion 11e and contacting a front portion of the front window 105 from above is integrally formed at the rear end of the upper wall rear portion 11e. Further, as illustrated in FIG. 6, at a rear portion of the upper wall rear portion 11e, multiple lower rear extension pieces 11h extending from the rear portion of the upper wall rear portion 11e toward the upper rear side in a crank shape and locking the front portion of the front window 105 from below are provided at intervals in the vehicle width direction. A rear portion of the upper wall portion 11 is locked such that the rear extension piece 11g and the lower rear extension pieces 11h are inserted into the front portion of the front window 105 from the front side and the front portion of the front window 105 is pinched by 11g, 11h from both of the upper and lower sides.

The front wall portion 21 described herein is positioned on the front side closer to the engine room E as compared to the upper wall portion 11, and is exposed to heat from the engine room E. For this reason, the upper wall portion 11 is, as described above, made of polypropylene, and the front wall portion 21 is made of glass fiber-containing polypropylene. With this configuration, thermal resistance of the front wall portion 21 is enhanced, and the front wall portion 21 is not susceptible to thermal damage from the engine room E.

In the cowl grille 10 with the divided structure, the positions of the front wall portion 21 and the upper wall portion 11 are determined by a position determination portion 32 (see FIGS. 2, 3, and 5) while the front wall portion 21 and the upper wall portion 11 are formed (assembled) into the assembly at the fastening portions 31 (see FIGS. 2, 3, and 4). In a state in which the front wall portion 21 and the upper wall portion 11 are, including the pair of right and left half upper wall portions 11R, 11L and the pair of right and left half front wall portions 21R, 21L, formed into the assembly, the cowl grille 10 is assembled to the lower front side of the front window 105 of the vehicle body as illustrated in FIG. 1.

The fastening portion 31 will be described in detail. As illustrated in FIG. 4, a boss portion 12 is formed to protrude from the upper wall front flange portion 11a, and an upper wall side fastening hole 13 provided with a screw portion 13a at an inner peripheral surface is formed at the boss portion 12. The front wall attachment piece portion 21e is provided in the vicinity of a portion of the front wall portion 21 corresponding to the upper wall side fastening hole 13 as viewed in plane, and a front wall side fastening hole 24 into which a tapping screw S is inserted is formed to open at the front wall attachment piece portion 21e. The fastening portion 31 includes the upper wall side fastening hole 13, the front wall side fastening hole 24, and the tapping screw S, and the front wall portion 21 and the upper wall portion 11 are integrally fastened and fixed by the multiple fastening portions 31 provided in the vehicle width direction.

As illustrated in FIGS. 2 and 3, the position determination portion 32 has two types of an upper-to-lower position determination portion 32a and a planar position determination portion 32b. The single upper-to-lower position determination portion 32a is, for determination of the positions of the upper wall portion 11 and the front wall portion 21 in the upper-to-lower direction, provided on each of the right and left sides with respect to the middle portion of the cowl grille 10 in the vehicle width direction. On the other hand, the multiple planar position determination portions 32b are provided on each of the right and left sides for determination of the positions of the upper wall portion 11 and the front wall portion 21 in a planar direction (the front-to-rear direction and the vehicle width direction).

Specifically, at the upper wall front flange portion 11a, a planar position determination protruding piece 14 is integrally formed to protrude in a stepped manner toward the front wall attachment piece portion 21e as illustrated in FIG. 5. On the other hand, the front wall attachment piece portion 21e is provided in the vicinity of a portion of the front wall portion 21 corresponding to the planar position determination protruding piece 14 as viewed in plane, and a planar position determination hole 25 (a fitting hole) into which the planar position determination protruding piece 14 is inserted is formed to open at the front wall attachment piece portion 21e.

The planar position determination portion 32b includes the planar position determination protruding piece 14 and the planar position determination hole 25, and the positions of the front wall portion 21 and the upper wall portion 11 in the planar (precisely, a plane perpendicular to an insertion direction) direction can be determined in such a manner that the planar position determination protruding piece 14 is inserted into the planar position determination hole 25.

Figure 7A:
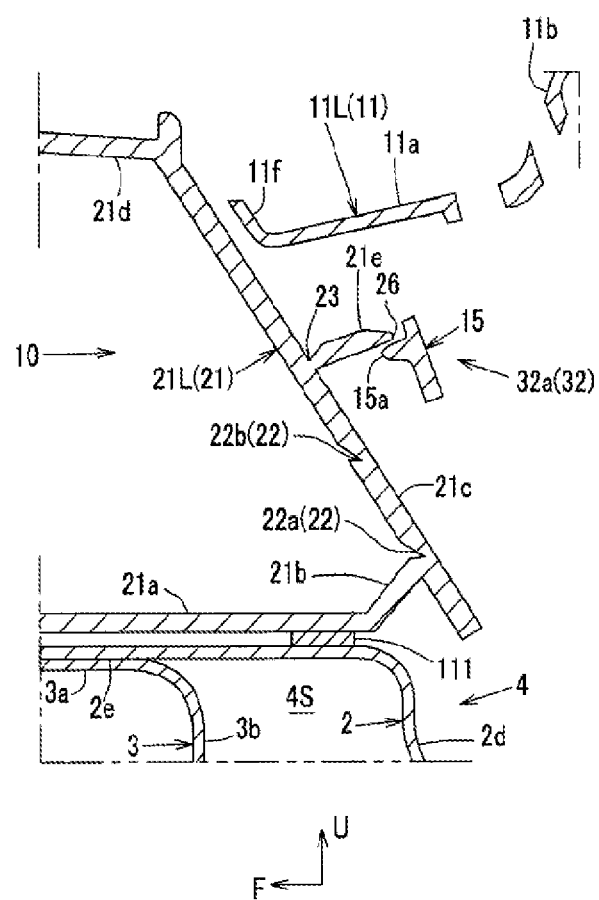
FIG. 7A is an enlarged sectional view of a main portion along a D-D line of FIG. 3.
Figure 7B:
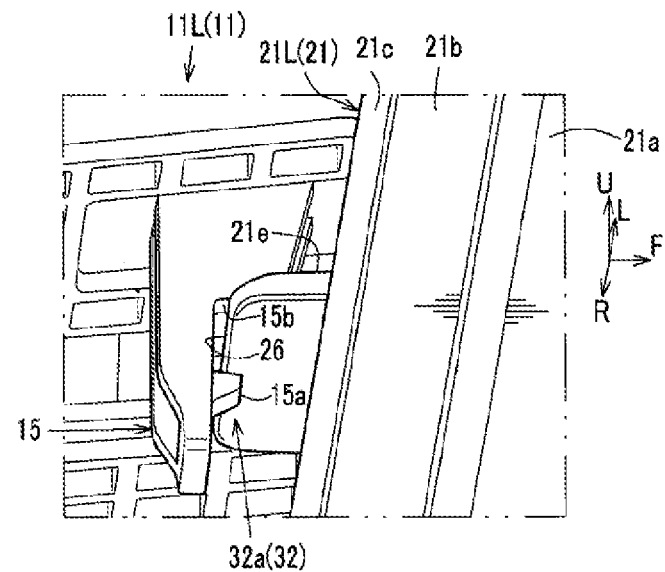
FIG. 7B is a perspective view of a locking portion from a lower left side.
Figure 7C:
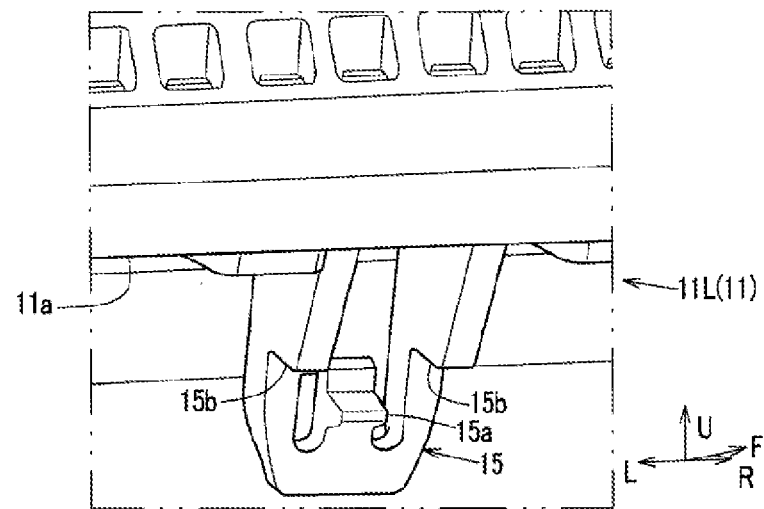
FIG. 7C is a perspective view of the locking portion from a left front side, a front wall portion being omitted.

Further, at the upper wall front flange portion 11a, a locking portion 15 as an upper-to-lower position determination protruding piece is integrally formed to protrude toward the front wall attachment piece portion 21e as illustrated in FIGS. 7A, 7B, and 7C. The locking portion 15 is formed in a U-shape as viewed from the front (see FIG. 7C). A locking claw portion 15a protruding substantially forward is formed on the front side of a top end portion (a lower portion) of the locking portion 15, and a pair of right and left locking step portions 15b having stepped surfaces extending forward with spacing from an upper surface of the locking claw portion 15a on the lower side is formed on the front side on both lateral sides at a middle position in the upper-to-lower direction (see FIGS. 7B and 7C).

On the other hand, the front wall attachment piece portion 21e is provided in the vicinity of a portion corresponding to the locking portion 15 as viewed in plane, and a rear edge portion 26 of the front wall attachment piece portion 21e is formed as a locking edge portion (a locking target portion) locked with the locking edge portion being sandwiched by the locking claw portion 15a and the locking step portions 15b from each of the upper and lower sides (see FIGS. 7A and 7B).

The upper-to-lower position determination portion 32a includes the locking portion 15 (specifically, the locking claw portion 15a and the locking step portions 15b) and the rear edge portion 26 of the front wall attachment piece portion 21e. The locking claw portion 15a and the locking step portions 15b engage with the rear edge portion 26 of the front wall attachment piece portion 21e so that the positions of the upper wall portion 11 and the front wall portion 21 can be determined in the upper-to-lower direction.

Further, the upper-to-lower position determination portion 32a employs, as described above, such a configuration that only the rear edge portion 26 as part of the front wall attachment piece portion 21e is locked by the locking portion 15 (the locking claw portion 15a and the locking step portions 15b) and the positions in the upper-to-lower direction are determined accordingly.

For example, unlike a configuration in which a through-hole is, although not shown in the figure, provided at the front wall attachment piece portion 21e and a locking portion as an upper-to-lower position determination protruding piece is inserted into the through-hole to engage with the entirety of a peripheral edge of the through-hole, the locking portion 15 can easily disengage from the rear edge portion 26 of the front wall attachment piece portion 21e when load acts from above the cowl grille 10.

Thus, the upper-to-lower position determination portion 32a allows the front wall attachment piece portion 21e to greatly bend downward about the cutout 23 as the point of support when the above-described load acts from above, and as a result, the cowl grille 10 can be easily separated into the front wall portion 21 and the upper wall portion 11 without problem in rupturing of the fastening portion 31.

As illustrated in FIG. 3, the upper wall front flange portion 11a is continuously formed across the substantially entire length of the upper wall portion 11 in the vehicle width direction, and the upper wall side fastening hole 13 (the fastening portion 31), the planar position determination protruding piece 14 (the planar position determination portion 32b), and the locking portion 15 (the upper-to-lower position determination portion 32a) are provided at predetermined spots of the upper wall front flange portion 11a with spacing in the vehicle width direction.

On the other hand, as illustrated in FIGS. 2 and 3, the front wall attachment piece portion 21e is, at the front wall portion 21, formed only in the vicinity of the front wall side fastening hole 24 (the fastening portion 31), the planar position determination hole 25 (the planar position determination portion 32b), and the rear edge portion 26 (the upper-to-lower position determination portion 32a) of the front wall attachment piece portion 21e in the vehicle width direction, and the multiple front wall attachment piece portions 21e are formed with spacing in the vehicle width direction.

In short, the multiple front wall attachment piece portions 21e are, for weakening, non-continuously formed with spacing in the vehicle width direction, and are configured to promote separation from the upper wall front flange portion 11a by rupturing of the fastening portions 31 and the position determination portions 32 when the load acts from above.

As illustrated in FIGS. 1 to 3 and FIG. 5, specifically in FIG. 5, the cowl grille 10 formed as the assembly is mounted on the vehicle body in such a manner that the front wall base portion 21a is fixed to the upper portion of the cowl box 4, precisely a front portion of each of the front flange portions 2e, 3a of the cowl member 2 and the cowl reinforcement 3, with fasteners F across multiple spots in the vehicle width direction.

Note that a reference numeral 40R in FIG. 2 indicates a cowl center provided on the right side of the vehicle, and the cowl center 40R is a tray member configured to prevent water dripping down from a front end of the front window 105 along an upper surface thereof from entering an air conditioning opening.

A reference numeral 40L in FIG. 3 is a cowl center attached to a lower surface of the upper wall portion 11 and provided on the left side of the vehicle, and the cowl center 40L is a guide member configured to guide water flowing along an upper surface of the front portion of the front window 105 to bypass, e.g., a wiper motor (not shown) such that the wiper motor or a wiper link is not exposed to the water flowing along the upper surface of the front portion of the front window 105 at such a front portion.

Action of the above-described cowl grille structure will be described.

When load acts on the cowl grille 10 from the bonnet 103 side (from above), the load is concentrated on the fastening portion 31 for the upper wall portion 11 and the front wall portion 21.

As described above, the front wall attachment piece portions 21e are each formed with spacing in the vehicle width direction in the vicinity of at least the fastening portions 31 for the upper wall portions 11 (see FIGS. 2 and 3), and the front wall attachment piece portion 21e includes, on the base side thereof, the cutout 23 for the load in the upper-to-lower direction (see FIGS. 2, 4, 5, and 7A). Thus, by the load from above, the front wall attachment piece portion 21e is displaced to deform and bend downward about a base portion as the point of support. With this configuration, the front wall attachment piece portion 21e fastened to the upper wall front flange portion 11a through the fastening portion 31 can be, for example, ruptured and separated from the front wall body portion 21c at the base portion.

Consequently, the cowl grille 10 can be separated into the front wall portion 21 and the upper wall portion 11 without resistance of the fastening portion 31 in response to load input from above.

Further, in a state in which the upper wall portion 11 is detached from the front wall portion 21, the upper wall portion 11 is deformed to tilt while the contact portion 11f (see FIGS. 4 to 7A) of the front end of the upper wall portion 11 is, from above, pressing down the front wall body portion 21c inclined in the front-higher rear-lower manner. In this state, the front wall portion 21 is detached from the upper wall portion 11, and therefore, is deformed without resistance of the fastening portion 31. Specifically, the bending promotion portion 22 is formed at a portion of the front wall body portion 21c on the rear side of a portion facing the contact portion 11f of the upper wall portion 11, and therefore, the front wall portion 21 can be deformed in the upper-to-lower direction to more tilt about the bending promotion portion 22 as the point of support by press-down load from the contact portion 11f of the upper wall portion 11.

As described above, the automobile cowl grille structure of the present embodiment is the structure (see FIGS. 1, 2, and 4 to 7A) including the resin cowl grille 10 divided into the upper wall portion 11 and the front wall portion 21, configured such that the bending promotion portion 22 configured to induce bending deformation upon action of the load from above is formed at the front wall portion 21 (see FIGS. 4 to 7A), and provided to cover the upper portion of the cowl box 4. The front wall portion 21 includes the front wall body portion 21c and the front wall attachment piece portion 21e extending backward from the front wall body portion 21c (see FIGS. 2 and 4 to 7A), and the front wall portion 21 is the structure for fastening the front portion of the upper wall portion 11 to the front wall attachment piece portion 21e (FIGS. 2 to 4). The cutout 23 as a weak portion for the load in the upper-to-lower direction is provided on the base side of the front wall attachment piece portion 21e (see FIGS. 2, 4 to 5, and 7A).

According to the above-described configuration, a situation can be avoided, in which when the load acts on the cowl grille 10 from above, the cowl grille 10 is not separated into the upper wall portion 11 and the front wall portion 21 and the bending promotion portion 22 fails to function due to, e.g., keeping in an integrally-fastened state. That is, when the above-described load acts, the front wall attachment piece portion 21e is, for example, ruptured starting from the cutout 23, and therefore, the cowl grille 10 can be separated into the upper wall portion 11 and the front wall portion 21. Thus, bending of the front wall portion 21 can be promoted at the bending promotion portion 22.

In one embodiment, the multiple front wall attachment piece portions 21e are each formed with spacing in the vehicle width direction in the vicinity of the fastening portions 31 for the upper wall portions 11 (see FIGS. 2 to 4).

According to the above-described configuration, the front wall attachment piece portion 21e is formed in the vicinity of each fastening portion 31 in the vehicle width direction, and therefore, stiffness of the front wall attachment piece portion 21e can be reduced (weakened). Thus, when the load acts from above, the front wall attachment piece portion 21e fastened to the upper wall front flange portion 11a through the fastening portion 31 can be ruptured, and the cowl grille 10 can be easily separated into the upper wall portion 11 and the front wall portion 21.

The automobile cowl grille structure of the present embodiment is the structure (see FIGS. 1, 2, and 4 to 7A) including the resin cowl grille 10 divided into the upper wall portion 11 and the front wall portion 21, configured such that the bending promotion portion 22 configured to induce bending deformation upon action of the load from above is formed at the front wall portion 21 (see FIGS. 4 to 7A), and provided to cover the upper portion of the cowl box 4. The front wall portion 21 includes the front wall body portion 21c and the front wall attachment piece portion 21e extending backward from the front wall body portion 21c (see FIGS. 2, 4 to 5, and 7A), and the front wall portion 21 is the structure for fastening the upper wall front flange portion 11a as the front portion of the upper wall portion 11 to the front wall attachment piece portion 21e (see FIGS. 2 to 4). The multiple front wall attachment piece portions 21e are each formed with spacing in the vehicle width direction in the vicinity of the fastening portions 31 for the upper wall portions 11 (see FIGS. 2 to 4).

According to the above-described configuration, the front wall attachment piece portion 21e is formed in the vicinity of each fastening portion 31 in the vehicle width direction, and therefore, the stiffness of the front wall attachment piece portion 21e can be reduced (weakened). Thus, when the load acts from above, the front wall attachment piece portion 21e fastened to the upper wall front flange portion 11a through the fastening portion 31 can be ruptured, and the cowl grille 10 can be separated into the upper wall portion 11 and the front wall portion 21. Consequently, deformation of the bending promotion portion 22 can be facilitated when the load acts from above.

In one embodiment, the front wall portion 21 is inclined such that the upper side is forward of the lower side as viewed from the side, and the bending promotion portion 22 is formed at the portion on the rear side of the contact portion 11f positioned at the front end of the upper wall portion 11 (see FIGS. 4 to 7A).

According to the above-described configuration, when the load acts from above, the front wall portion 21 is pressed down by the contact portion 11f after the vicinity of the fastening portion 31 between the upper wall portion 11 and the front wall portion 21 has been ruptured, and therefore, the bending promotion portion 22 can function securely. That is, bending of the front wall portion 21 can be promoted at the bending promotion portion 22, and the front wall portion 21 can be easily deformed.

In one embodiment, the upper wall portion 11 is made of the PP material (polypropylene), and the front wall portion 21 is made of the glass fiber-containing PP material.

According to the above-described configuration, the front wall portion 21 arranged closer to an engine is made of the glass fiber-containing PP material, and therefore, the cowl grille 10 is less susceptible to heat from the engine.

On the other hand, the upper wall portion 11 is made of the PP material, and therefore, a cost can be reduced as compared to a configuration in which the entirety of the cowl grille 10 is made of the glass fiber-containing PP material.

Further, the cutout 23 is, as described above, provided on the base side of the front wall attachment piece portion 21e, and the multiple front wall attachment piece portions 21e are each formed with spacing in the vehicle width direction in the vicinity of the fastening portions 31 for the upper wall portions 11. Thus, even when the stiffness is enhanced by formation of the front wall portion 21 from the glass fiber-containing PP material, the cowl grille 10 can be separated into the upper wall portion 11 and the front wall portion 21 upon action of the load from above. Consequently, even the front wall portion 21 with high stiffness can be reliably deformed at the bending promotion portion 22.

The technique disclosed herein is not limited only to the configuration of the above-described embodiment, and can be implemented in various embodiments.

What is claimed is:

1. An automobile cowl grille structure wherein
a cowl grille is made of resin, and is provided to cover an upper portion of a cowl box,
the cowl grille includes
an upper wall portion, and
a front wall portion separated from the upper wall portion and provided with a bending promotion portion for inducing bending deformation upon action of load from above,
the front wall portion includes
a front wall body portion, and
an attachment piece portion extending backward from the front wall body portion and fastened to a front portion of the upper wall portion,
a weak portion for load in an upper-to-lower direction is provided on a base side of the attachment piece portion,
the front wall portion is inclined such that an upper side is forward of a lower side as viewed from a side, and
a contact portion coming into contact with the front wall portion from the above and pressing down the front wall portion when the load acting from the above is formed at a front end of the upper wall.

2. The automobile cowl grille structure according to claim 1, wherein
the weak portion is formed in a cutout shape at a corner portion between the front wall body portion and the attachment piece portion.

3. The automobile cowl grille structure according to claim 1, wherein
the attachment piece portion includes multiple attachment piece portions each formed with spacing in a vehicle width direction in a vicinity of fastening portions for the upper wall portion.

4. The automobile cowl grille structure according to claim 1, wherein
the bending promotion portion is formed at a portion on a rear side of a front end of the upper wall portion.

5. The automobile cowl grille structure according to claim 1, wherein
the upper wall portion is made of a polypropylene, and the front wall portion is made of a glass fiber-containing polypropylene.

6. An automobile cowl grille structure wherein
a cowl grille is made of resin, and is provided to cover an upper portion of a cowl box,
the cowl grille includes
an upper wall portion, and
a front wall portion separated from the upper wall portion and provided with a bending promotion portion for inducing bending deformation upon action of load from above, the front wall portion includes
a front wall body portion, and
multiple attachment piece portions extending backward from the front wall body portion and fastened to a front portion of the upper wall portion,
the multiple attachment piece portions are each provided with spacing in a vehicle width direction in a vicinity of fastening portions for the upper wall portion,
the front wall portion is inclined such that an upper side is forward of a lower side as viewed from a side, and
a contact portion coming into contact with the front wall portion from the above and pressing down the front wall portion when the load acting from the above is formed at a front end of the upper wall.

7. The automobile cowl grille structure according to claim 6, wherein
the bending promotion portion is formed at a portion on a rear side of a front end of the upper wall portion.

8. The automobile cowl grille structure according to claim 6, wherein
the upper wall portion is made of a polypropylene, and the front wall portion is made of a glass fiber-containing polypropylene.

9. The automobile cowl grille structure according to claim 1, wherein the bending promotion portion is formed at a portion on a rear side of the contact portion.

10. The automobile cowl grille structure according to claim 6, wherein the bending promotion portion is formed at a portion on a rear side of the contact portion.

* * * * *